(12) United States Patent
Zhao et al.

(10) Patent No.: US 11,240,514 B2
(45) Date of Patent: *Feb. 1, 2022

(54) INTRA MODE CODING

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,342

(22) Filed: Sep. 29, 2020

(65) Prior Publication Data

US 2021/0014508 A1 Jan. 14, 2021

Related U.S. Application Data

(63) Continuation of application No. 16/549,524, filed on Aug. 23, 2019, now Pat. No. 10,819,986, which is a continuation of application No. 16/198,951, filed on Nov. 23, 2018, now Pat. No. 10,469,845.

(60) Provisional application No. 62/734,996, filed on Sep. 21, 2018.

(51) Int. Cl.
*H04N 19/167* (2014.01)
*H04N 19/11* (2014.01)

(52) U.S. Cl.
CPC ........... *H04N 19/167* (2014.11); *H04N 19/11* (2014.11)

(58) Field of Classification Search
CPC .............................. H04N 19/167; H04N 19/11

USPC .................................................. 375/240.12
See application file for complete search history.

(56) References Cited

U.S. PATENT DOCUMENTS

| 2013/0336398 A1 | 12/2013 | Lee et al. |
| 2015/0043641 A1 | 2/2015 | Gamei et al. |
| 2016/0373770 A1 | 12/2016 | Zhao et al. |

OTHER PUBLICATIONS

International Search Report dated Sep. 30, 2019 in International Application No. PCT/US2019/049636.
Written Opinion of the International Searching Authority dated Sep. 30, 2019 in International Application No. PCT/US2019/049636.
Bross et al., "Versatile Video Coding (Draft 2)", Joint Video Experts Team (JVET) of ITU-T SG 16 WP 3 and ISO/IEC JTC 1/SC 29/WG 11, pp. 60-61, Jul. 10-18, 2018 (136 pages total).
Extended European Search Report dated May 3, 2021 in European Application No. 19861637.7.

(Continued)

*Primary Examiner* — Matthew K Kwan
(74) *Attorney, Agent, or Firm* — Sughrue Mion, PLLC

(57) ABSTRACT

A method of and an apparatus for controlling intra prediction for decoding of a video sequence are provided. The method includes determining a ratio of a width to a height of a coding unit, and based on the determined ratio being different than one, adding, to a table including intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles. The method further includes selecting, for decoding the video sequence, one of the intra prediction modes and the additional intra prediction modes added to the table.

19 Claims, 9 Drawing Sheets

(56) References Cited

OTHER PUBLICATIONS

Bross et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L1001-v9 (235 pages total).

Zhao et al., "CE3-related: Unification of angular intra prediction for square and non-square blocks", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0279 (10 pages total).

Bross et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1001-v3 (72 pages total).

Chen et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1002-v1 (19 pages total).

Sjoberg et al., "Description of SDR and HDR video coding technology proposal by Ericsson and Nokia", Joint Video Exploration Team (JVET) of ITU-T SG 16 WP 3 and ISO/IEC JTC 1/SC 29/WG 11, 10th Meeting: San Diego, CA, USA, Apr. 10-20, 2018, JVET-J0012-v1 (32 pages total).

INTRA MODE CODING

CROSS-REFERENCE TO RELATED APPLICATIONS

This is a continuation application of U.S. patent application Ser. No. 16/549,524, filed on Aug. 23, 2019, in the United States Patent and Trademark Office, which is a continuation application of U.S. patent application Ser. No. 16/198,951, filed on Nov. 23, 2018, in the United States Patent and Trademark Office, which claims priority from U.S. Provisional Patent Application No. 62/734,996, filed on Sep. 21, 2018, in the United States Patent and Trademark Office, which are incorporated herein by reference in their entireties.

BACKGROUND

1. Field

Methods and apparatuses consistent with embodiments relate to video processing, and more particularly, a method and an apparatus for intra mode coding.

2. Description of Related Art

Intra prediction modes used in High Efficiency Video Coding (HEVC) are illustrated in FIG. 1. In HEVC, there is a total of 35 intra prediction modes, among which mode 10 (101) is a horizontal mode, mode 26 (102) is a vertical mode, and mode 2 (103), mode 18 (104) and mode 34 (105) are diagonal modes. The intra prediction modes are signaled by three most probable modes (MPMs) and 32 remaining modes.

To code an intra mode, a most probable mode (MPM) list of size 3 is built based on intra modes of the neighboring blocks. This MPM list will be referred to as the MPM list or a primary MPM list. One MPM flag is signaled to indicate whether a current mode belongs to the MPM list. If the MPM flag is true, an unary code is used to signal an MPM index. If the MPM flag is false, a 5 bit fix length coding is used to signal the remaining modes.

A process of generating the MPM list generation is shown as follows. Here, leftIntraDir indicates a mode in a left block, and aboveIntraDir indicates a mode in an above block. If the left or above block is currently not available, leftIntraDir or aboveIntraDir is set to an index DC_IDX. In addition, variables "offset" and "mod" are the constant values, which are set to 29 and 32, respectively.

- If (leftIntraDir == aboveIntraDir && leftIntraDir > DC_IDX)
  - MPM [0] = leftIntraDir;
  - MPM [1] = ((leftIntraDir + offset) % mod) + 2;
  - MPM [2] = ((leftIntraDir − 1) % mod) + 2;
- Else if (leftIntraDir == aboveIntraDir)
  - MPM [0] = PLANAR_IDX;
  - MPM [1] = DC_IDX;
  - MPM [2] = VER_IDX;
- Else if (leftIntraDir != aboveIntraDir)
  - MPM [0] = leftIntraDir;
  - MPM [1] = aboveIntraDir;
  - If (leftIntraDir > 0 && aboveIntraDir > 0)
    - MPM [2] = PLANAR_IDX;
  - Else
    - MPM [2] = (leftIntraDir + aboveIntraDir) < 2 ? VER_IDX : DC_IDX;

SUMMARY

According to embodiments, a method of controlling intra prediction for decoding of a video sequence is performed by at least one processor and includes determining a ratio of a width to a height of a coding unit, and based on the determined ratio being different than one, adding, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles. The method further includes selecting, for decoding the video sequence, one of the plurality of intra prediction modes and the additional intra prediction modes added to the table.

According to embodiments, an apparatus for controlling intra prediction for decoding of a video sequence includes at least one memory configured to store computer program code, and at least one processor configured to access the at least one memory and operate according to the computer program code. The computer program code includes determining code configured to cause the at least one processor to determine a ratio of a width to a height of a coding unit, and adding code configured to cause the at least one processor to, based on the determined ratio being different than one, add, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles. The computer program code further includes selecting code configured to cause the at least one processor to select, for decoding the video sequence, one of the plurality of intra prediction modes and the additional intra prediction modes added to the table.

According to embodiments, a non-transitory computer-readable storage medium storing instructions that cause a processor to determine a ratio of a width to a height of a coding unit, and based on the determined ratio being different than one, add, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles. The instructions further cause the processor to select, for decoding a video sequence, one of the plurality of intra prediction modes and the additional intra prediction modes added to the table.

DETAILED DESCRIPTION

Figure 1:
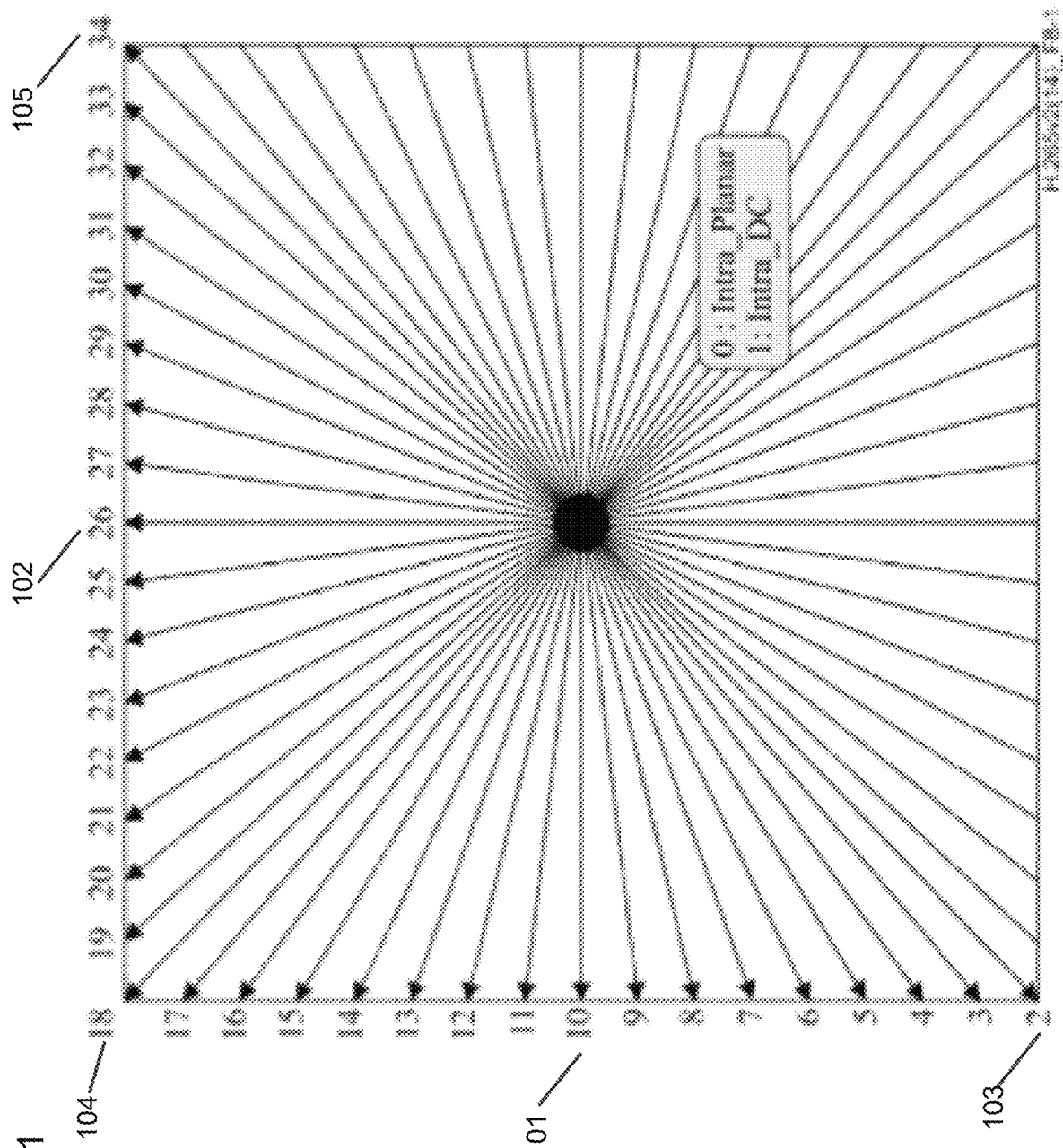
FIG. 1 is a diagram of intra prediction modes in HEVC.
Figure 2:
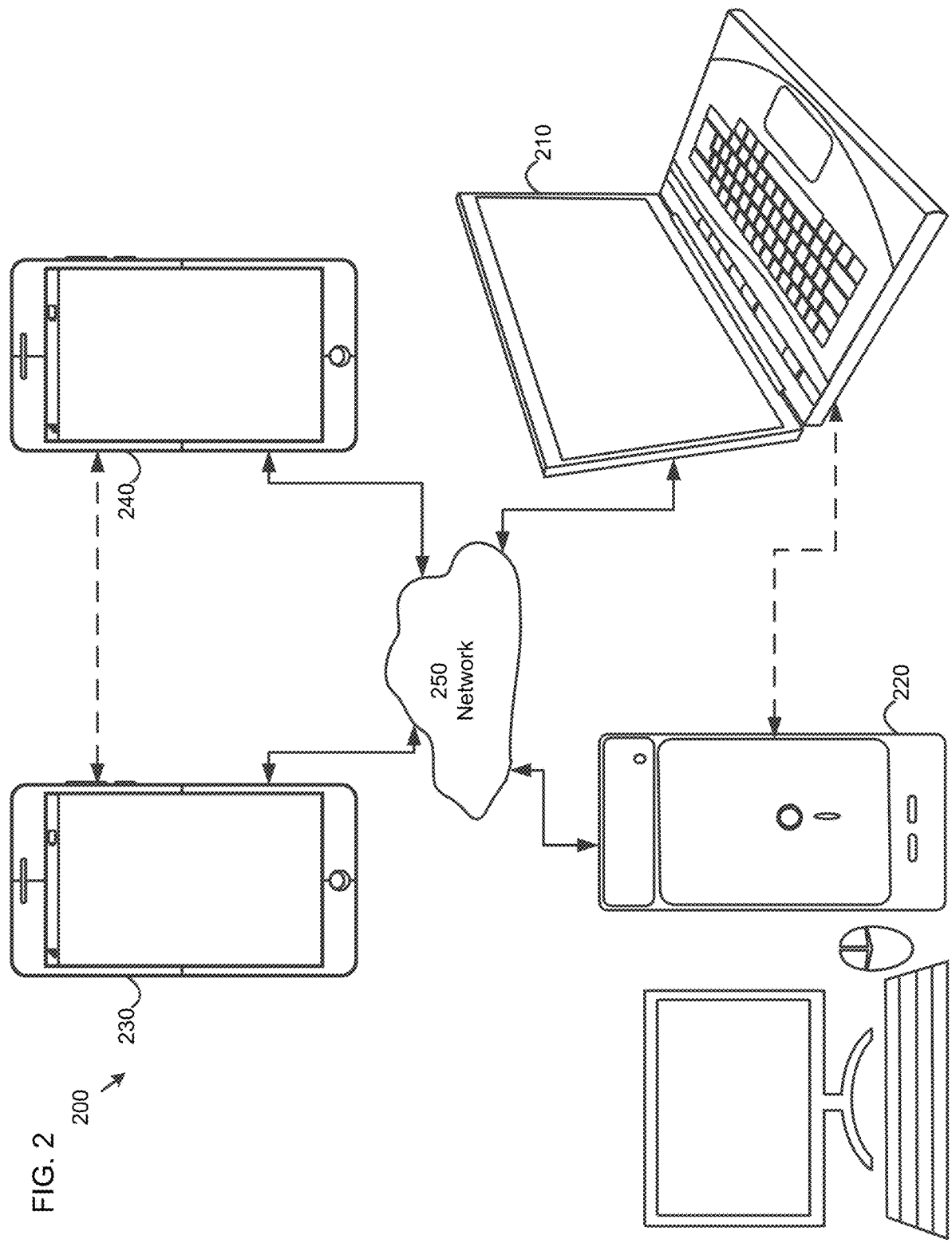
FIG. 2 is a simplified block diagram of a communication system according to an embodiment.

FIG. 2 is a simplified block diagram of a communication system (200) according to an embodiment. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
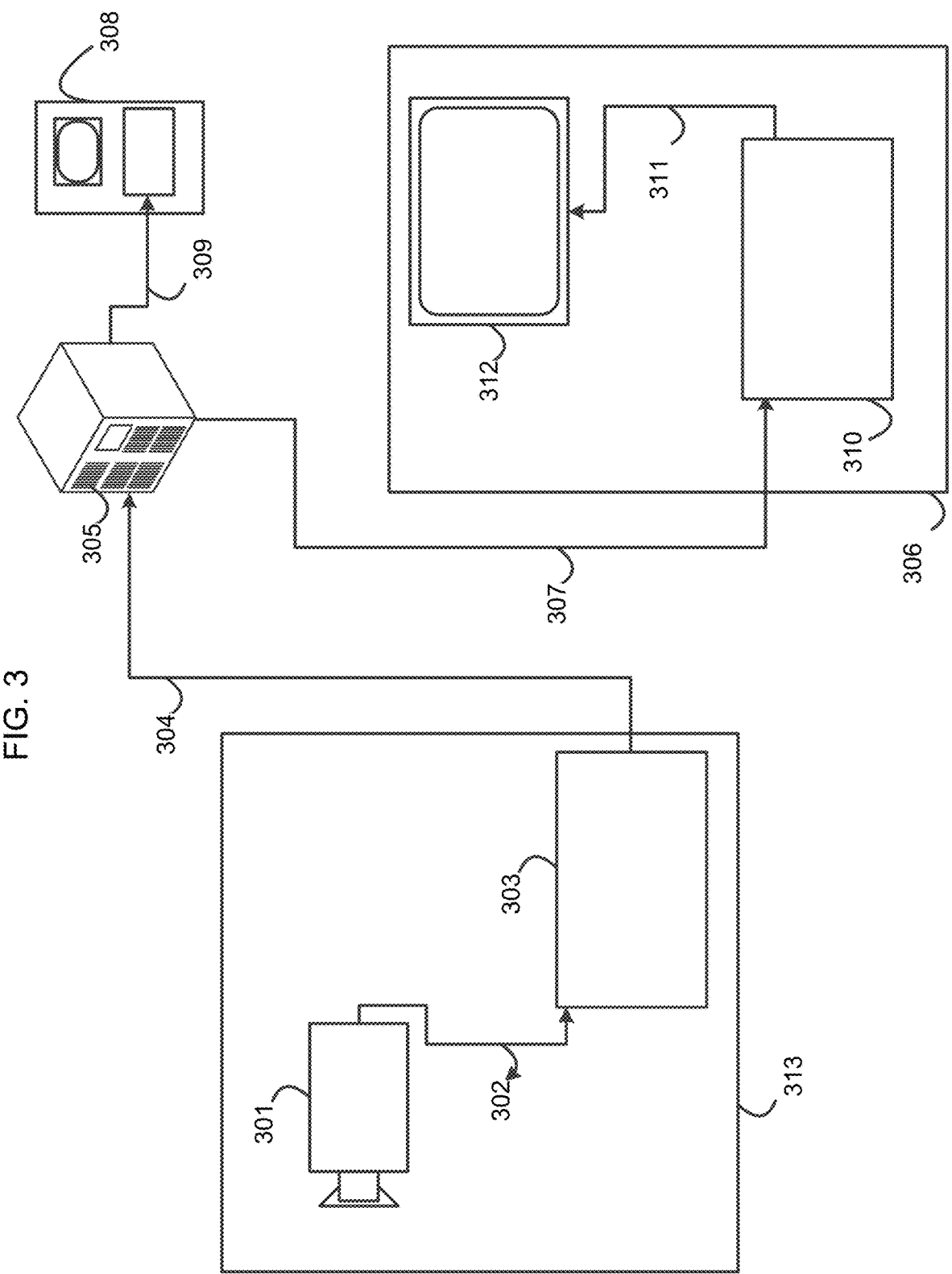
FIG. 3 is a diagram of a placement of a video encoder and a video decoder in a streaming environment, according to an embodiment.

FIG. 3 is a diagram of a placement of a video encoder and a video decoder in a streaming environment, according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
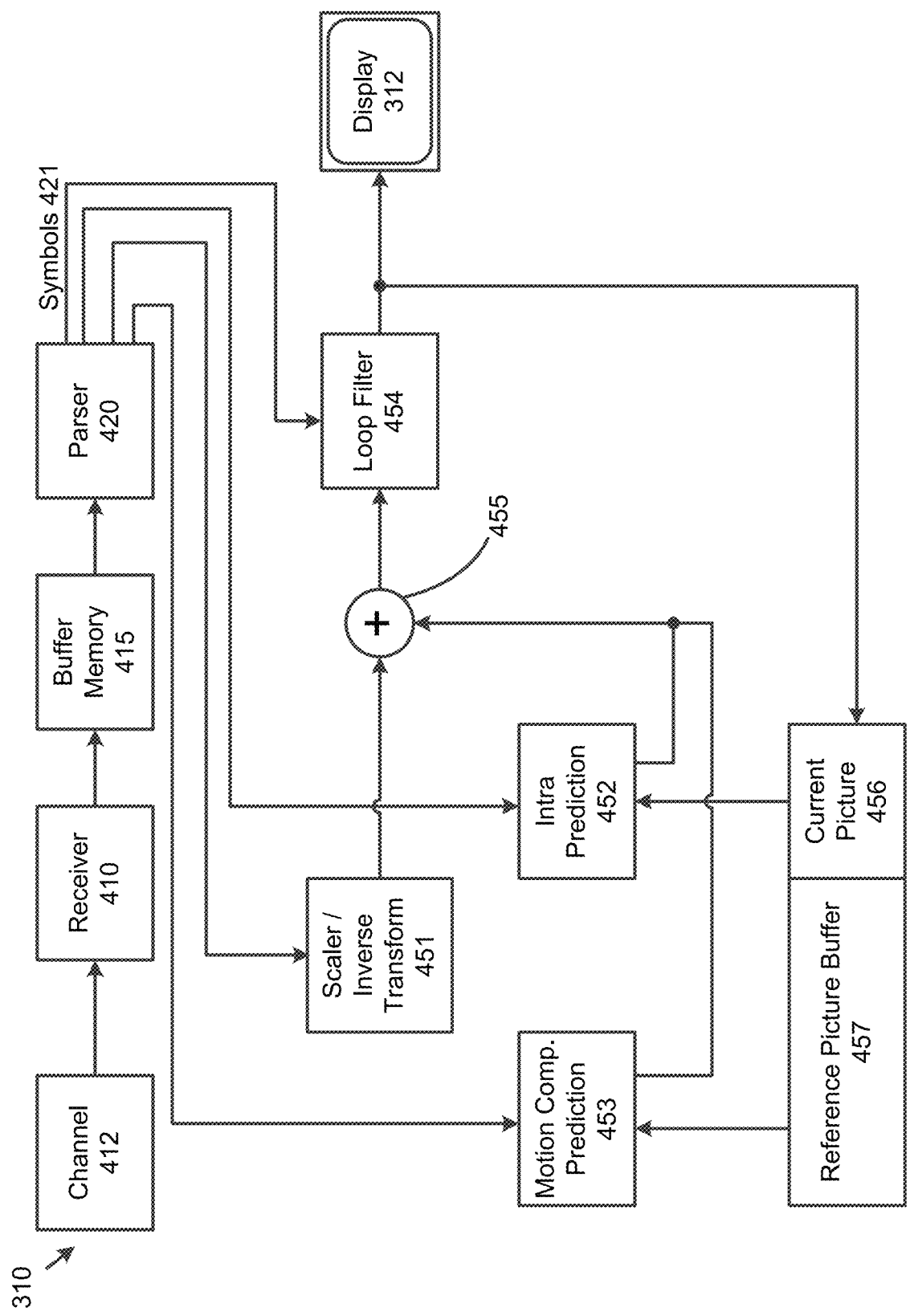
FIG. 4 is a functional block diagram of a video decoder according to an embodiment.

FIG. 4 is a functional block diagram of a video decoder (310) according to an embodiment.

A receiver (410) may receive one or more codec video sequences to be decoded by the decoder (310); in the same or an embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosynchronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
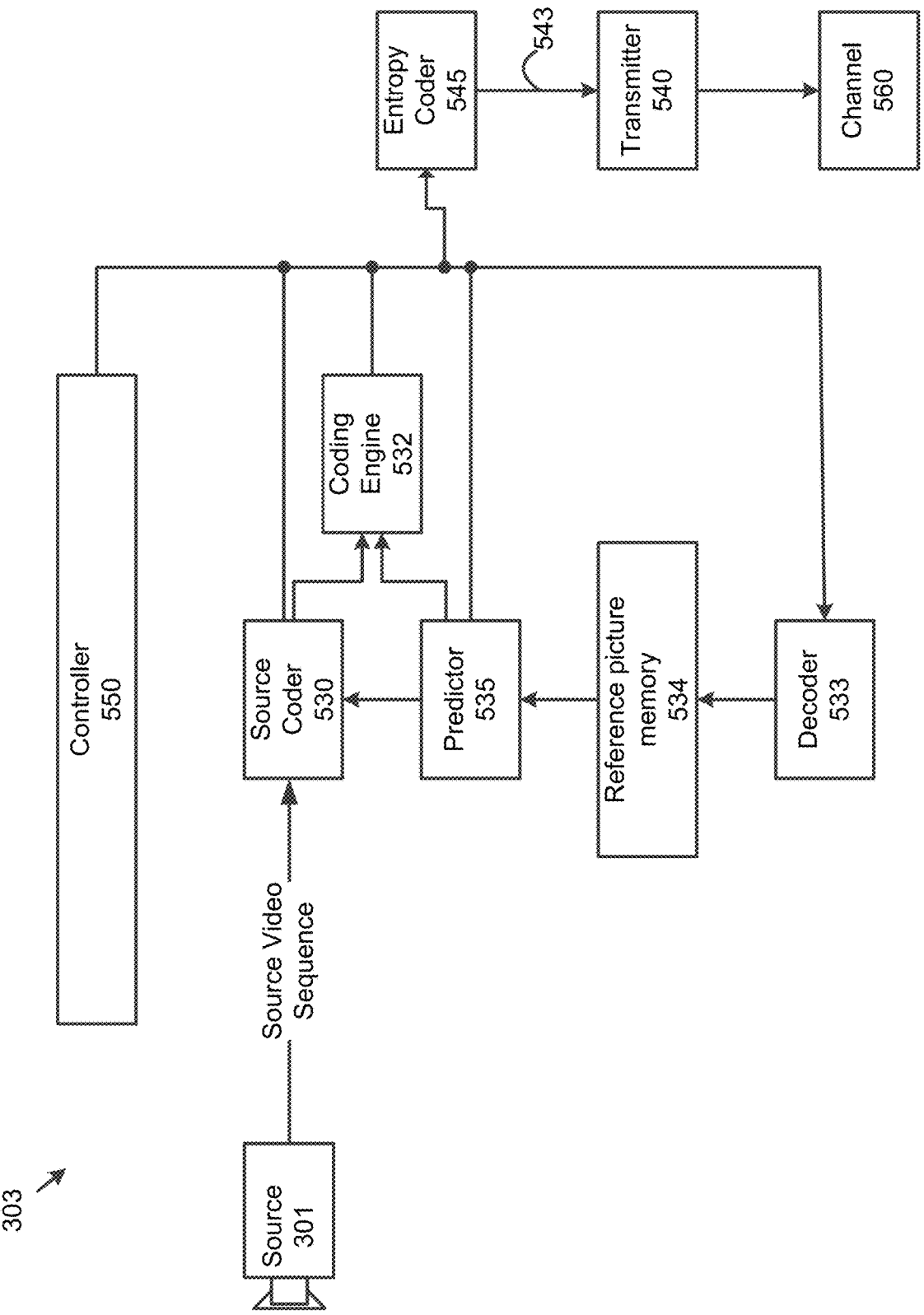
FIG. 5 is a functional block diagram of a video encoder according to an embodiment.

FIG. 5 is a functional block diagram of a video encoder (303) according to an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 6:
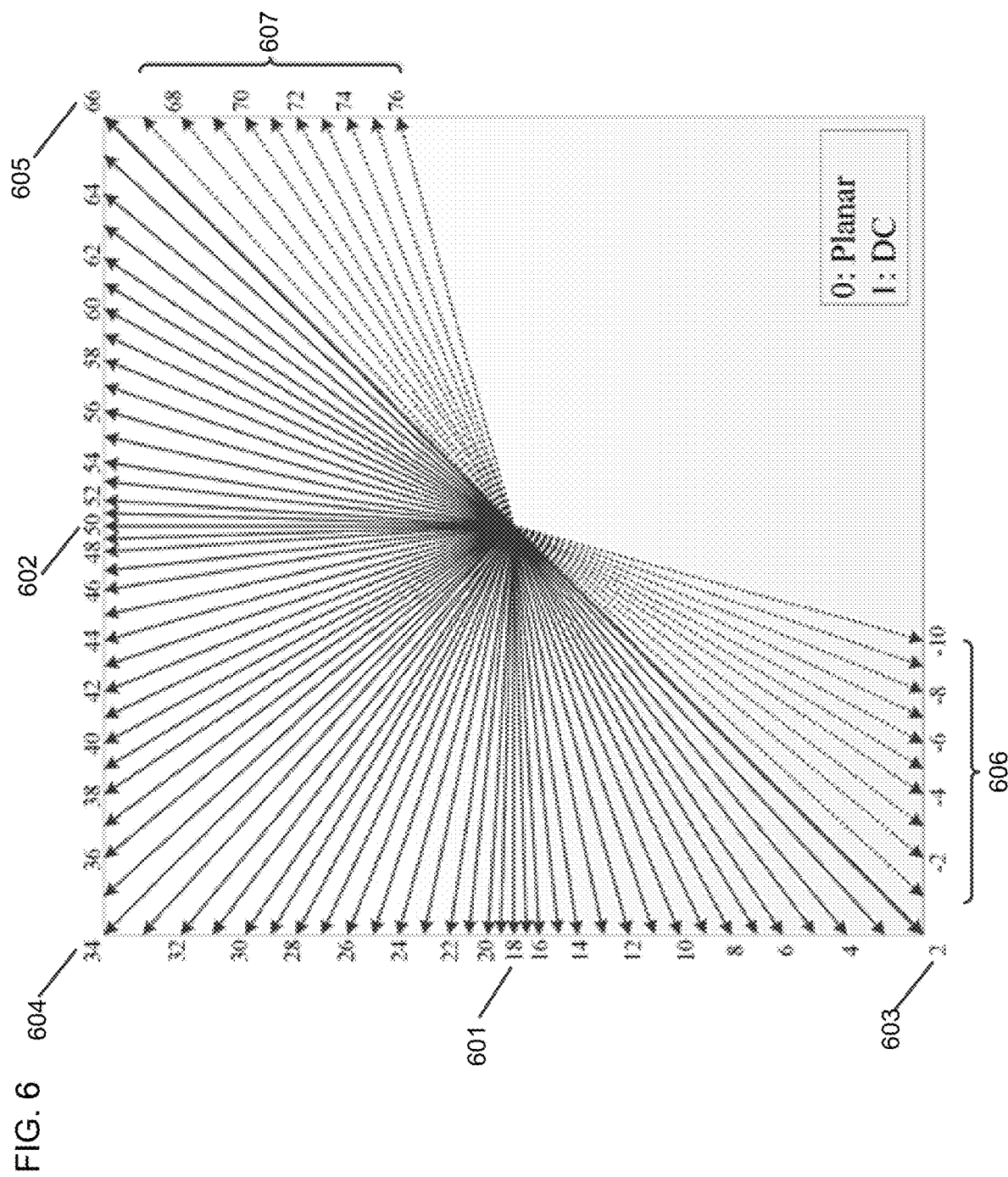
FIG. 6 is a diagram of intra prediction modes in Versatile Video Coding (VVC) Draft 2.

FIG. 6 is a diagram of intra prediction modes in VVC Draft 2.

In VVC Draft 2, there is a total of 87 intra prediction modes as shown in FIG. 6, among which mode 18 (601) is a horizontal mode, mode 50 (602) is a vertical mode, and mode 2 (603), mode 34 (604) and mode 66 (605) are diagonal modes. Modes −1 to 10 and modes 67 to 76 are called Wide-Angle Intra Prediction (WAIP) modes.

Thirty-five HEVC intra prediction modes are included in VVC Draft 2, and mode numbers of these 35 HEVC modes are 0, 1, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, and 66.

In VVC Draft 2, a size of an MPM list is still 3, and a MPM list generation process is the same as HEVC. A difference is that an "offset" is changed to 61, and a variable "mod" is changed to 64 because there are 67 signaled modes in VVC Draft 2.

For mode coding, firstly, one MPM flag is signaled to indicate whether a current mode belongs to the MPM list. If the MPM flag is true, then a truncated unary code is used to signal an MPM index. If the MPM flag is false, then 6 bit fix length coding is used to signal remaining modes.

The following clause from VVC Draft 2 describes a luma intra mode coding process:

1. The neighbouring locations ( xNbA, yNbA ) and ( xNbB, yNbB ) are set equal to ( xPb − 1, yPb ) and ( xPb, yPb − 1 ), respectively.
2. For X being replaced by either A or B, the variables candIntraPredModeX are derived as follows:
   - The availability derivation process for a block as specified in clause 6.4.X [Ed. (BB): Neighbouring blocks availability checking process tbd] is invoked with the location ( xCurr, yCurr ) set equal to ( xPb, yPb ) and the neighbouring location ( xNbY, yNbY ) set equal to ( xNbX, yNbX ) as inputs, and the output is assigned to availableX.
   - The candidate intra prediction mode candIntraPredModeX is derived as follows:
     - If one or more of the following conditions are true, candIntraPredModeX is set equal to INTRA_DC.
       - The variable availableX is equal to FALSE.
       - CuPredMode[ xNbX ][ yNbX ] is not equal to MODE_INTRA.
       - X is equal to B and yPb − 1 is less than ( ( yPb >> CtbLog2SizeY ) << CtbLog2SizeY ).
     - Otherwise, candIntraPredModeX is set equal to IntraPredModeY[ xNbX ][ yNbX ].
3. The candModeList[ x ] with x = 0..2 is derived as follows:
   - If candIntraPredModeB is equal to candIntraPredModeA, the following applies:
     - If candIntraPredModeA is less than 2 (i.e., equal to INTRA_PLANAR or INTRA_DC), candModeList[ x ] with x = 0..2 is derived as follows:

candModeList[ 0 ] = INTRA_PLANAR        (8-1)
       candModeList[ 1 ] = INTRA_DC            (8-2)
       candModeList[ 2 ] = INTRA_ANGULAR50     (8-3)

- Otherwise, candModeList[ x ] with x = 0..2 is derived as follows:

candModeList[ 0 ] = candIntraPredModeA                      (8-4)
       candModeList[ 1 ] = 2 + ( ( candIntraPredModeA + 61 ) % 64 ) (8-5)
       candModeList[ 2 ] = 2 + ( ( candIntraPredModeA − 1 ) % 64 )  (8-6)

- Otherwise (candIntraPredModeB is not equal to candIntraPredModeA), the following applies:
     - candModeList[ 0 ] and candModeList[ 1 ] are derived as follows:

candModeList[ 0 ] = candIntraPredModeA   (8-7)
       candModeList[ 1 ] = candIntraPredModeB   (8-8)

- If neither of candModeList[ 0 ] and candModeList[ 1 ] is equal to INTRA_PLANAR, candModeList[ 2 ] is set equal to INTRA_PLANAR,
     - Otherwise, if neither of candModeList[ 0 ] and candModeList[ 1 ] is equal to INTRA_DC, candModeList[ 2 ] is set equal to INTRA_DC,
     - Otherwise, candModeList[ 2 ] is set equal to INTRA_ANGULAR50.
4. IntraPredModeY[ xPb ][ yPb ] is derived by applying the following procedure:
   - If intra_luma_mpm_flag[ xPb ][ yPb ] is equal to 1, the IntraPredModeY[ xPb ][ yPb ] is set equal to candModeList[ intra_luma_mpm_idx[ xPb ][ yPb ] ].

- Otherwise, IntraPredModeY[ xPb ][ yPb ] is derived by applying the following ordered steps:
    1. The array candModeList[ x ], x = 0..2 is modified by the following ordered steps:
        i. When candModeList[ 0 ] is greater than candModeList[ 1 ], both values are swapped as follows:
            ( candModeList[ 0 ], candModeList[ 1 ] ) = Swap( candModeList[ 0 ], candModeList[ 1 ] ) (8-9)
        ii. When candModeList[ 0 ] is greater than candModeList[ 2 ], both values are swapped as follows:
            ( candModeList[ 0 ], candModeList[ 2 ] ) = Swap( candModeList[ 0 ], candModeList[ 2 ] ) (8-10)
        iii. When candModeList[ 1 ] is greater than candModeList[ 2 ], both values are swapped as follows:
            ( candModeList[ 1 ], candModeList[ 2 ] ) = Swap( candModeList[ 1 ], candModeList[ 2 ] ) (8-11)
    2. IntraPredModeY[ xPb ][ yPb ] is derived by the following ordered steps:
        i. IntraPredModeY[ xPb ][ yPb ] is set equal to intra_luma_mpm_remainder[ xPb ][ yPb ].
        ii. For i equal to 0 to 2, inclusive, when IntraPredModeY[ xPb ][ yPb ] is greater than or equal to candModeList[ i ], the value of IntraPredModeY[ xPb ][ yPb ] is incremented by one.

The variable IntraPredModeY[ x ][ y ] with x = xPb..xPb + cbWidth − 1 and y = yPb..yPb + cbHeight − 1 is set to be equal to IntraPredModeY[ xPb ][ yPb ].

In the development of VVC Draft 2, an MPM list with a size of 6 was proposed. Planar and DC modes are included in the MPM list. Two neighboring modes, left and above modes, are used to generate a remaining 4 MPMs.

However, in VVC Draft 2, the number of the available intra prediction modes is more than 67, which costs many bits to signal. There is a strong correlation between a current block and its neighboring blocks, which may be used to reduce the number of signaled intra prediction modes for the current block.

Proposed methods below may be used separately or combined in any order.

In the description below, if one mode is not a planar or DC mode, or one mode is generating prediction samples according a given prediction direction, such as intra prediction modes 2 to 76 and −1 to −10 as defined in VVC Draft 2, this mode is called an angular mode.

In the description below, an allowed intra prediction mode (AIPM) set is defined as one mode set with modes that can be used for intra prediction of a current block, and a disallowed intra prediction mode (DIPM) set is defined as one mode set with modes that cannot be signaled or used for intra prediction of the current block.

Two variables are used in this document, offset and mod. The values of these two variables can have the following two sets:
1) offset=61, mod=64; or
2) offset=62, mod=65.

In an embodiment, there are two intra prediction mode sets for each block, which are an AIPM set and a DIPM set. For each block, modes in these two mode sets may be different depending on coded information of neighboring blocks and/or a current block, and may include but not be limited to intra prediction modes of neighboring blocks, intra prediction modes of current blocks, an aspect ratio, a coded block flag (CBF), primary and/or secondary transform types, neighboring reconstructed samples and so on.

In an embodiment, the modes in the AIPM set and the DIPM sets are dependent on the intra prediction modes of the neighboring blocks.

In an embodiment, neighboring modes are included in the AIPM set but not included in the DIPM set.

In an embodiment, blocks with a same aspect ratio or a same width and/or height can have a different AIPM set and/or a different DIPM set.

In an embodiment, for each angular neighboring mode, denoted by ang_mode, certain modes can be derived by the below equations 1 and 2, and the derived modes are included in the AIPM set but not included in the DIPM set.

$$(\text{ang\_mode} + \text{offset} - \text{diff}) \% \text{mod} + 2 \quad \text{(Equation 1)}$$

$$(\text{ang\_mode} - 1 + \text{diff}) \% \text{mod} + 2 \quad \text{(Equation 2)}$$

In Equations 1 and 2, diff is a variable, and is a positive integer or zero. In an example, diff can be any value equal to or less than 6. In another example, diff can be any value equal to or less than 3. In still another example, diff can be any value in set {0, 1, 2, 3, 5, 7}.

In an embodiment, to reduce the complexity of reconstructing the AIPM set, a number of derived modes are restricted by a threshold, denoted by Thres. Thres can be any positive integer, such as 16, 32 or 48.

In an embodiment, the modes in the AIPM and DIPM sets are dependent on the inter prediction modes of the neighboring blocks.

In an embodiment, the modes in the AIPM and DIPM sets are dependent on whether the neighboring blocks are intra coded, or inter coded, or coded by an Intra Block Copy (IBC) mode, or coded by a MERGE mode, or coded by a SKIP mode, or coded by another coding mode.

In an embodiment, reconstructed pixels of neighboring blocks are used to derive allowed and non-allowed intra prediction mode sets.

In an embodiment, a gradient of neighboring reconstructed samples is used to derive the modes in the AIPM and DIPM sets. The gradient can be computed by one of the following methods including, but not limited to: a first-order gradient method, a second-order gradient method, and a biconjugate gradient method.

In an embodiment, an edge detection method or an image feature detection method can be used to derive the modes in the AIPM and DIPM sets. The edge detection method includes, but is not limit to, one of a Sobel operator, a Laplace operator, a Canny edge detector, a Kayyali operator, a SUSAN corner detector, and so on.

In an embodiment, the number of modes included in the AIPM and DIPM sets are predefined and fixed for all blocks.

In an embodiment, the number of modes included in the AIPM set is denoted by S, and S is equal to M plus a power of two, for example=$M+2^K$, where M and K are positive integers, for example, M=6 and K=5. M can be no larger than 7. Examples values include but are not limited to 3, 4, 5, 6, and 7.

In an embodiment, a size of the AIPM set is denoted by S, and S is equal to M plus multiple levels of a power of two, for example $S=M+2^K+2^L$, where M, K, and L are positive integers, for example M=6, K=4, L=5. M can be no larger than 7. Examples values include but are not limited to 3, 4, 5, 6, and 7.

In an embodiment, the number of modes included in the AIPM and DIPM sets are predefined and fixed for each block size, or each block aspect ratio, or each block shape. However, the number of modes included in the AIPM and DIPM sets can be different for different block sizes, or a different block aspect ratio, or a different block shape.

In an embodiment, when the size of the AIPM set is S and the number of derived intra prediction modes from neighboring modes are less than S, default modes are used to fill the AIPM set.

In an embodiment, all HEVC intra prediction modes are included in the default modes. In an example, S is equal to or larger than 35.

In an embodiment, all intra prediction modes associated with even mode indices are included in the default modes. In an example, S is equal to or larger than 35.

In an embodiment, angular modes associated with odd mode indices are included into default modes after HEVC intra prediction modes have been included.

In an embodiment, when the size of the AIPM set is 38, the default modes are predefined as follows {0, 1, 2, 50, 18, 34, 66, 10, 26, 42, 58, 6, 14, 22, 30, 38, 46, 54, 62, 4, 8, 12, 16, 20, 24, 28, 32, 36, 40, 44, 48, 52, 56, 60, 64, 17, 19, 49}.

In an embodiment, when the size of the AIPM set is larger than 35, all HEVC intra prediction modes, or all intra prediction modes associated with even mode indices, or all intra prediction modes associated with odd mode indices, are always included in the AIPM set, but not included in the DIPM set.

In an embodiment, for the AIPM set, it can be further split into two lists, a primary MPM list and a non-MPM list, and a size of the non-MPM list is a power of 2.

In an embodiment, to code a mode in the AIPM set, firstly, one MPM flag is signaled to indicate whether the current mode belongs to the primary MPM list. If the MPM flag is true, a truncated unary code is used to signal the MPM index. Otherwise, fix length coding is used to signal the mode in the non-MPM list.

Twenty-eight or thirty wide angles and respective wide angular intra prediction modes are added into a table of original angles and respective original angular intra prediction modes, according to an aspect ratio of a current block.

In an embodiment, 14 or 15 wide angles and respective wide angular intra prediction modes are added into a bottom-left direction of the current block (e.g., a bottom edge 606 of FIG. 6), and another 14 or 15 wide angles and respective wide angular intra prediction modes are added into a top-right direction (e.g., a right edge 607 of FIG. 6) of the current block. Implementations of examples are shown in Tables 1-2 below.

An angle table for wide angles together with original angles are shown as follows.

In an example, an angle table of 32 angles (angTable[32]) may include angles {0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}, in which angles {0, 1, 2, 3, 4, 6, 8, 10, 12, 14, 16, 18, 20, 23, 26, 29, 32} are original angles and angles {35, 39, 45, 51, 57, 64, 73, 86, 102, 128, 171, 256, 341, 512, 1024} are wide angles.

In other words, each of the angles may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32, 35/32, 39/32, 45/32, 51/32, 57/32, 64/32, 73/32, 86/32, 102/32, 128/32, 171/32, 256/32, 341/32, 512/32, 1024/32}.

Table 1 may be an example of such an angle table with respective intra prediction modes in VVC having 67 original angles and 67 respective original angular intra prediction modes, to which 30 wide angles and 30 respective wide angular intra prediction modes are added:

TABLE 1

| Specification of intraPredAngle | | | | | | | | | | | | | | | | | |
|---|---|---|---|---|---|---|---|---|---|---|---|---|---|---|---|---|---|
| predModeIntra | | | | | | | | | | | | | -15 | -14 | -13 | -12 | -11 |
| intraPredAngle | | | | | | | | | | | | | 1024 | 512 | 341 | 256 | 171 |
| predModeIntra | -10 | -9 | -8 | -7 | -6 | -5 | -4 | -3 | -2 | -1 | 2 | 3 | 4 | 5 | 6 | 7 | 8 |
| intraPredAngle | 128 | 102 | 86 | 73 | 64 | 57 | 51 | 45 | 39 | 35 | 32 | 29 | 26 | 23 | 20 | 18 | 16 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 14 | 12 | 10 | 8 | 6 | 4 | 3 | 2 | 1 | 0 | -1 | -2 | -3 | -4 | -6 | -8 | -10 |
| predModeIntra | 26 | 27 | 28 | 29 | 30 | 31 | 32 | 33 | 34 | 35 | 36 | 37 | 38 | 39 | 40 | 41 | 42 |
| intraPredAngle | -12 | -14 | -16 | -18 | -20 | -23 | -26 | -29 | -32 | -29 | -26 | -23 | -20 | -18 | -16 | -14 | -12 |
| predModeIntra | 43 | 44 | 45 | 46 | 47 | 48 | 49 | 50 | 51 | 52 | 53 | 54 | 55 | 56 | 57 | 58 | 59 |
| intraPredAngle | -10 | -8 | -6 | -4 | -3 | -2 | -1 | 0 | 1 | 2 | 3 | 4 | 6 | 8 | 10 | 12 | 14 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 16 | 18 | 20 | 23 | 26 | 29 | 32 | 35 | 39 | 45 | 51 | 57 | 64 | 73 | 86 | 102 | 128 |
| predModeIntra | 77 | 78 | 79 | 80 | 81 | | | | | | | | | | | | |
| intraPredAngle | 171 | 256 | 341 | 512 | 1024 | | | | | | | | | | | | | predModeIntra denotes intra prediction modes in VVC, and intraPredAngle denotes intra prediction angles.

In another example, an angle table of 31 angles (angTable[31]) may include angles {0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512}, in which angles {0, 1, 2, 3, 4, 6, 8, 10, 12, 14, 16, 18, 20, 23, 26, 29, 32} are original angles and angles {35, 39, 45, 51, 57, 64, 73, 86, 102, 128, 171, 256, 341, 512} are wide angles.

In other words, each of the angles may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32, 35/32, 39/32, 45/32, 51/32, 57/32, 64/32, 73/32, 86/32, 102/32, 128/32, 171/32, 256/32, 341/32, 512/32}.

Table 2 may be an example of such an angle table with respective intra prediction modes in VVC having 67 original angles and 67 respective original angular intra prediction modes, to which 28 wide angles and 28 respective wide angular intra prediction modes are added:

TABLE 2

Specification of intraPredAngle

| predModeIntra | | | | | | | | | | | | | | -14 | -13 | -12 | -11 |
|---|---|---|---|---|---|---|---|---|---|---|---|---|---|---|---|---|---|
| intraPredAngle | | | | | | | | | | | | | | 512 | 341 | 256 | 171 |
| predModeIntra | -10 | -9 | -8 | -7 | -6 | -5 | -4 | -3 | -2 | -1 | 2 | 3 | 4 | 5 | 6 | 7 | 8 |
| intraPredAngle | 128 | 102 | 86 | 73 | 64 | 57 | 51 | 45 | 39 | 35 | 32 | 29 | 26 | 23 | 20 | 18 | 16 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 14 | 12 | 10 | 8 | 6 | 4 | 3 | 2 | 1 | 0 | -1 | -2 | -3 | -4 | -6 | -8 | -10 |
| predModeIntra | 26 | 27 | 28 | 29 | 30 | 31 | 32 | 33 | 34 | 35 | 36 | 37 | 38 | 39 | 40 | 41 | 42 |
| intraPredAngle | -12 | -14 | -16 | -18 | -20 | -23 | -26 | -29 | -32 | -29 | -26 | -23 | -20 | -18 | -16 | -14 | -12 |
| predModeIntra | 43 | 44 | 45 | 46 | 47 | 48 | 49 | 50 | 51 | 52 | 53 | 54 | 55 | 56 | 57 | 58 | 59 |
| intraPredAngle | -10 | -8 | -6 | -4 | -3 | -2 | -1 | 0 | 1 | 2 | 3 | 4 | 6 | 8 | 10 | 12 | 14 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 16 | 18 | 20 | 23 | 26 | 29 | 32 | 35 | 39 | 45 | 51 | 57 | 64 | 73 | 86 | 102 | 128 |
| predModeIntra | 77 | 78 | 79 | 80 | | | | | | | | | | | | | |
| intraPredAngle | 171 | 256 | 341 | 512 | | | | | | | | | | | | | |

The following text describes text changes (with strike-through and underlining) to VVC Draft 2, using the above-discussed embodiments:

8.2.4.2.7 Specification of INTRA_ANGULAR2..INTRA_ANGULAR66 intra prediction modes Inputs to this process are:
- the intra prediction mode predModeIntra,
- the neighbouring samples p[ x ][ y ], with x = -1, y = -1..refH - 1 and x = 0..refW - 1, y = -1,
- a variable nTbW specifying the transform block width,
- a variable nTbH specifying the transform block height,
- a variable refW specifying the reference samples width,
- a variable refH specifying the reference samples height.

Outputs of this process are the modified intra prediction Mode predModeIntra and the predicted samples predSamples[ x ][ y ], with x = 0..nTbW + 1, y = 0..nTbH + 1.
The variable whRatio is set equal to min( abs( Log2( nTbW / nTbH ) ), 2 ).
For non-square blocks (nTbW is not equal to nTbH), the intra prediction mode predModeIntra is modified as follows:
- If all of the following conditions are true, predModeIntra is set equal to ( predModeIntra + 65 ).
  - nTbW is greater than nTbH
  - predModeIntra is greater than or equal to 2
  - predModeIntra is less than ( whRatio > 1 ) ? 12 : 8
- Otherwise, if all of the following conditions are true, predModeIntra is set equal to ( predModeIntra - 67 ).
  - nTbH is greater than nTbW
  - predModeIntra is less than or equal to 66 predModeIntra is greater than ( whRatio > 1 ) ? 56 : 60

Figure 8:
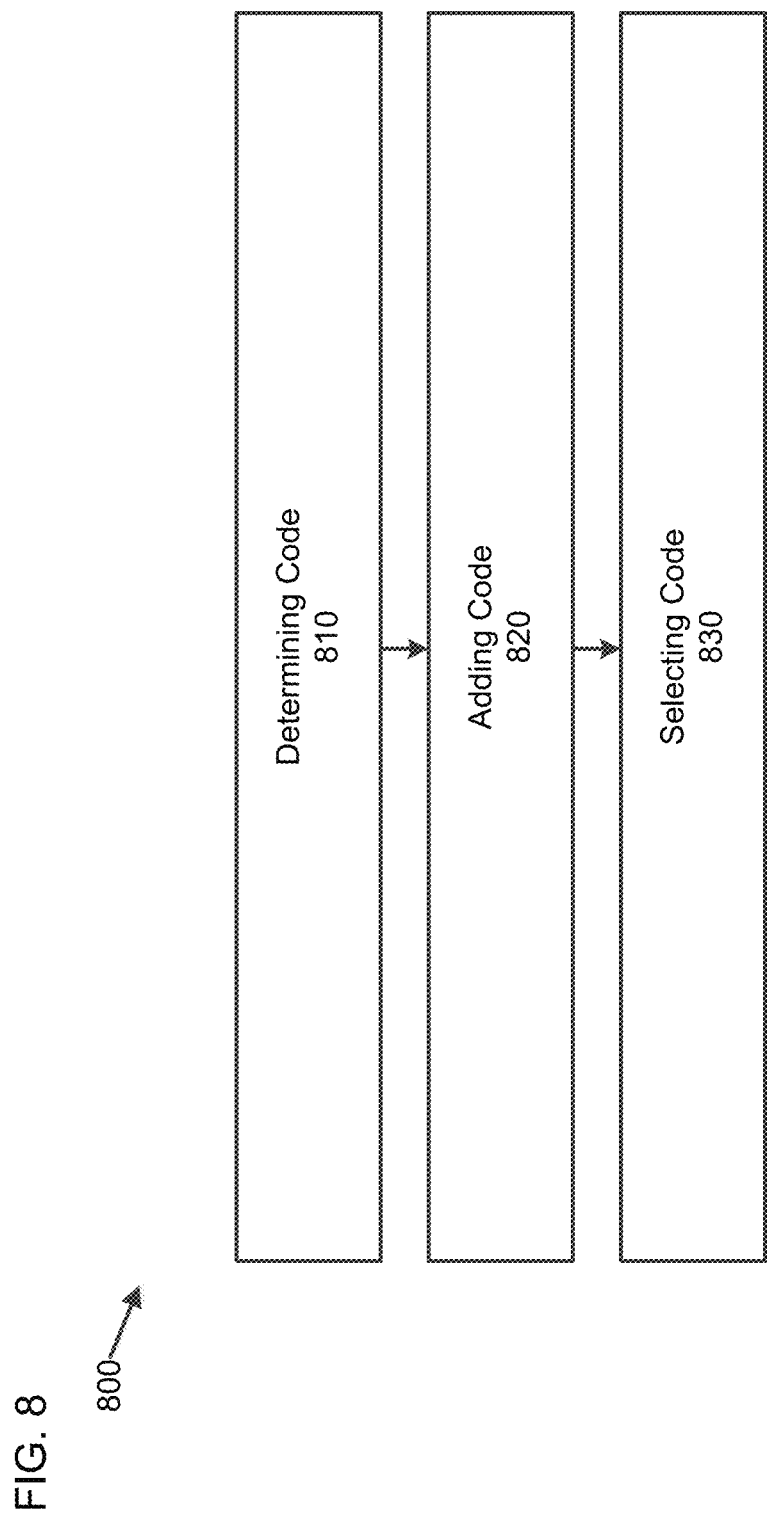
FIG. 8 is a simplified block diagram of an apparatus for controlling intra prediction for decoding of a video sequence, according to an embodiment.

Table 8-5 specifies the mapping table between predModeIntra and the angle parameter intraPredAngle and FIG. 8-3 illustrates the intra prediction angles for each angle parameter.

TABLE 8-5

Specification of intraPredAngle

| predModeIntra | | | | | | | | | | | | | | -14 | -13 | -12 | -11 |
|---|---|---|---|---|---|---|---|---|---|---|---|---|---|---|---|---|---|
| intraPredAngle | | | | | | | | | | | | | | 512 | 341 | 256 | 171 |
| predModeIntra | -10 | -9 | -8 | -7 | -6 | -5 | -4 | -3 | -2 | -1 | 2 | 3 | 4 | 5 | 6 | 7 | 8 |
| intraPredAngle | 128 | 102 | 86 | 73 | 64 | 57 | 51 | 45 | 39 | 35 | 32 | 29 | 26 | 23 | 20 | 18 | 16 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 14 | 12 | 10 | 8 | 6 | 4 | 3 | 2 | 1 | 0 | -1 | -2 | -3 | -4 | -6 | -8 | -10 |
| predModeIntra | 26 | 27 | 28 | 29 | 30 | 31 | 32 | 33 | 34 | 35 | 36 | 37 | 38 | 39 | 40 | 41 | 42 |
| intraPredAngle | -12 | -14 | -16 | -18 | -20 | -23 | -26 | -29 | -32 | -29 | -26 | -23 | -20 | -18 | -16 | -14 | -12 |
| predModeIntra | 43 | 44 | 45 | 46 | 47 | 48 | 49 | 50 | 51 | 52 | 53 | 54 | 55 | 56 | 57 | 58 | 59 |
| intraPredAngle | -10 | -8 | -6 | -4 | -3 | -2 | -1 | 0 | 1 | 2 | 3 | 4 | 6 | 8 | 40 | 12 | 14 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 16 | 18 | 20 | 23 | 26 | 29 | 32 | 35 | 39 | 45 | 51 | 57 | 64 | 73 | 86 | 102 | 128 |
| predModeIntra | 77 | 78 | 79 | 80 | | | | | | | | | | | | | |
| intraPredAngle | 171 | 256 | 341 | 512 | | | | | | | | | | | | | |

TABLE 9-4

| | Syntax elements and associated binarizations | | |
|---|---|---|---|
| multi_type_tree( ) | mtt_split_cu_flag | FL | cMax = 1 |
| | mtt_split_cu_vertical_flag | FL | cMax = 1 |
| | mtt_split_cu_binary_flag | FL | cMax = 1 |
| coding_unit( ) | cu_skip_flag[ ][ ] | FL | cMax = 1 |
| | pred_mode_flag | FL | cMax = 1 |
| | intra_luma_mpm_flag[ ][ ] | FL | cMax = 1 |
| | intra_luma_mpm_idx[ ][ ] | TR | cMax = 2, cRiceParam = 0 |
| | intra_luma_mpm_remainder[ ][ ] | FL | cMax = <u>31</u> <s>63</s> |
| | intra_chroma_pred_mode[ ][ ] | 9.3.3.6 | — |
| | merge_affine_flag[ ][ ] | FL | cMax = 1 |
| | merge_flag[ ][ ] | FL | cMax = 1 |
| | merge_idx[ ][ ] | TR | cMax = MaxNumMergeCand − 1, cRiceParam = 0 |
| | inter_pred_idc[ x0 ][ y0 ] | 9.3.3.7 | — |
| | inter_affine_flag[ ][ ] | FL | cMax = 1 |
| | cu_affine_type_flag[ ][ ] | FL | cMax = 1 |
| | ref_idx_l0[ ][ ] | TR | cMax = num_ref_idx_l0_active minus1, cRiceParam = 0 |
| | mvp_l0_flag[ ][ ] | FL | cMax = 1 |
| | ref_idx_l1[ ][ ] | TR | cMax = num_ref_idx_l1_active minus1, cRiceParam = 0 |
| | mvp_l1_flag[ ][ ] | FL | cMax = 1 |
| | amvr_mode[ ][ ] | TR | cMax = 2, cRiceParam = 0 |
| | cu_cbf | FL | cMax = 1 |

Figure 7:
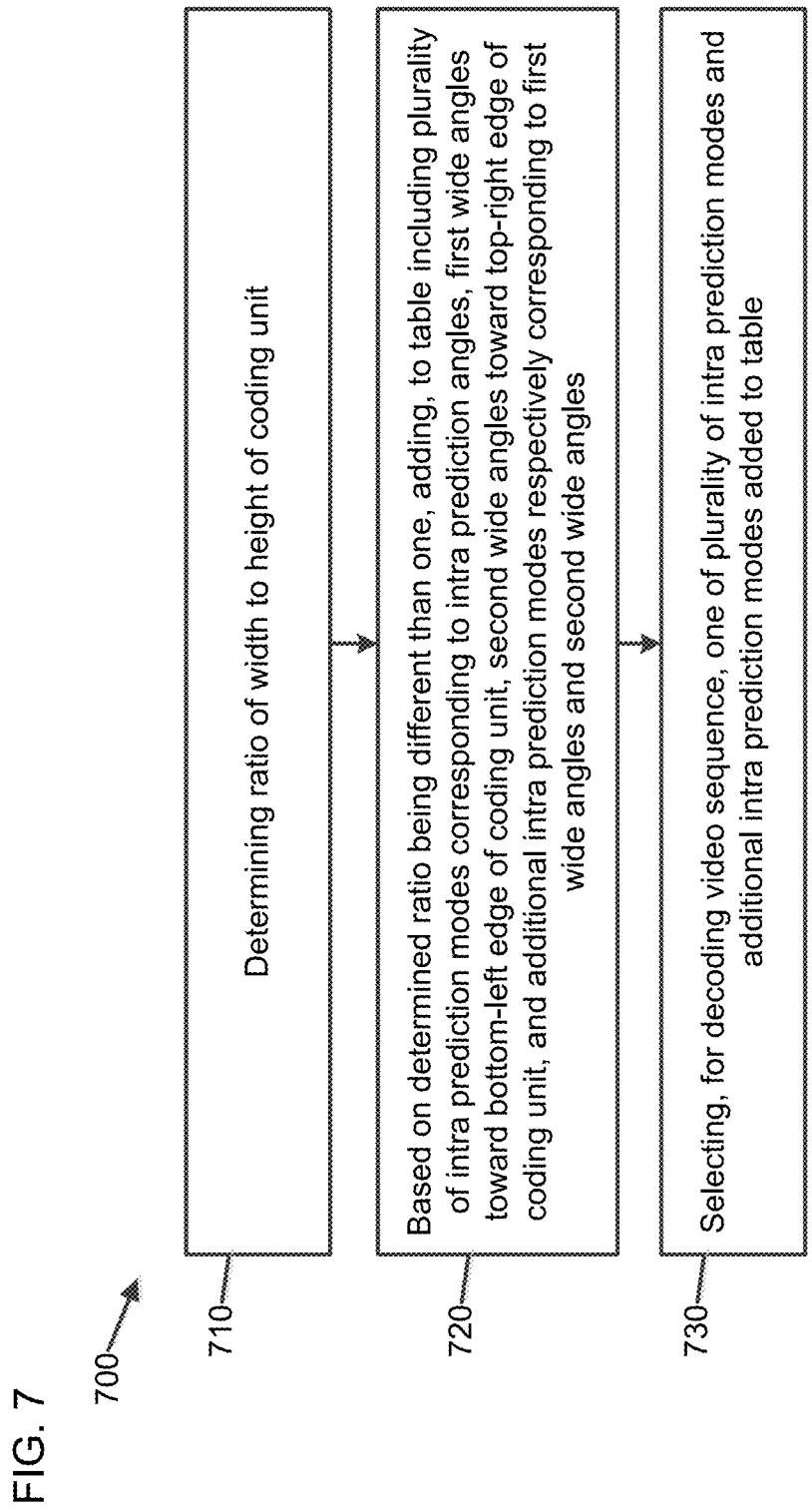
FIG. 7 is a flowchart illustrating a method of controlling intra prediction for decoding of a video sequence, according to an embodiment.

FIG. 7 is a flowchart illustrating a method (700) of controlling intra prediction for decoding of a video sequence, according to an embodiment. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes determining a ratio of a width to a height of a coding unit.

In a second block (720), the method (700) includes, based on the determined ratio being different than one, adding, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles.

A number of the first wide angles added to the table may be 14. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the first wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32}.

A number of the second wide angles added to the table may be 14. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the second wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32}.

A number of the first wide angles added to the table may be 15. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the first wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32, 1024/32}.

A number of the second wide angles added to the table may be 15. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the second wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32, 1024/32}.

A first number of the plurality of intra prediction modes included in the table may be 67, a second number of the additional intra prediction modes added to the table may be 28, and the table may include Table 2 above.

In a third block (730), the method (700) includes selecting, for decoding the video sequence, one of the plurality of intra prediction modes and the additional intra prediction modes added to the table.

Although FIG. 7 shows example blocks of the method (700), in some implementations, the method (700) may include additional blocks, fewer blocks, different blocks, or differently arranged blocks than those depicted in FIG. 7. Additionally, or alternatively, two or more of the blocks of the method (700) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

FIG. 8 is a simplified block diagram of an apparatus (800) for controlling intra prediction for decoding of a video sequence, according to an embodiment.

Referring to FIG. 8, the apparatus (800) includes determining code (810), adding code (820), and selecting code (830).

The determining code (810) is configured to determine a ratio of a width to a height of a coding unit.

The adding code (820) is configured to, based on the determined ratio being different than one, add, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles.

A number of the first wide angles added to the table may be 14. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the first wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32}.

A number of the second wide angles added to the table may be 14. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the second wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32}.

A number of the first wide angles added to the table may be 15. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the first wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32, 1024/32}.

A number of the second wide angles added to the table may be 15. Each of the intra prediction angles included in the table may have an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}, and each of the second wide angles added to the table may have the angular direction α with tan(α) equal to {35/32, 39/32, 45/32, 51/32, 57/32, 64/32, 73/32, 86/32, 102/32, 128/32, 171/32, 256/32, 341/32, 512/32, 1024/32}.

A first number of the plurality of intra prediction modes included in the table may be 67, a second number of the additional intra prediction modes added to the table may be 28, and the table may include Table 2 above.

The selecting code (830) is configured to select, for decoding the video sequence, one of the plurality of intra prediction modes and the additional intra prediction modes added to the table.

The techniques described above, can be implemented as computer software using computer-readable instructions and physically stored in one or more computer-readable media.

Figure 9:
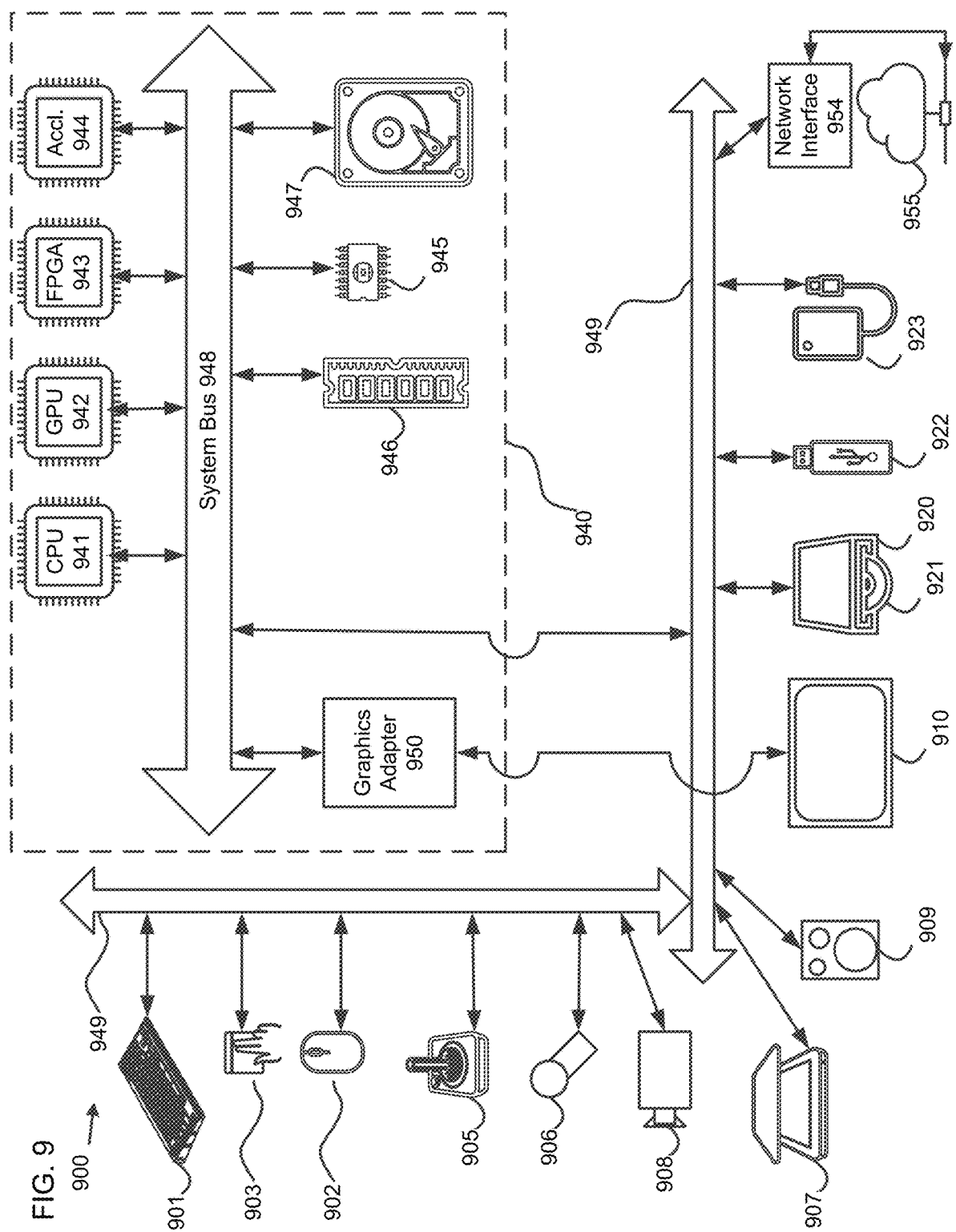
FIG. 9 is a diagram of a computer system suitable for implementing embodiments.

FIG. 9 is a diagram of a computer system (900) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (904), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (904), or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of controlling intra prediction for decoding of a video sequence, the method being performed by at least one processor, and the method comprising:
determining a ratio of a width to a height of a coding unit;
based on the determined ratio being different than one, adding, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles; and
selecting, for decoding the video sequence, one of the plurality of intra prediction modes and the additional intra prediction modes added to the table,
wherein each of the intra prediction angles included in the table has an angular direction $\alpha$ with $\tan(\alpha)$ equal to {0/32, 1/32, 2/32, 3/32, 4/32, 6/32, 8/32, 10/32, 12/32, 14/32, 16/32, 18/32, 20/32, 23/32, 26/32, 29/32, 32/32}.

2. The method of claim 1, wherein a number of the first wide angles added to the table is 14.

3. The method of claim 2, wherein each of the first wide angles added to the table has an angular direction $\alpha$ with $\tan(\alpha)$ equal to {35/32, 39/32, 45/32, 51/32, 57/32, 64/32, 73/32, 86/32, 102/32, 128/32, 171/32, 256/32, 341/32, 512/32}.

4. The method of claim 1, wherein a number of the second wide angles added to the table is 14.

5. The method of claim 4, wherein each of the second wide angles added to the table has an angular direction $\alpha$ with $\tan(\alpha)$ equal to {35/32, 39/32, 45/32, 51/32, 57/32, 64/32, 73/32, 86/32, 102/32, 128/32, 171/32, 256/32, 341/32, 512/32}.

6. The method of claim 1, wherein a number of the first wide angles added to the table is 15.

7. The method of claim 6, wherein each of the first wide angles added to the table has an angular direction $\alpha$ with $\tan(\alpha)$ equal to {35/32, 39/32, 45/32, 51/32, 57/32, 64/32, 73/32, 86/32, 102/32, 128/32, 171/32, 256/32, 341/32, 512/32, 1024/32}.

8. The method of claim 1, wherein a number of the second wide angles added to the table is 15.

9. The method of claim 8, wherein each of the second wide angles added to the table has an angular direction α with tan(α) equal to {35/32, 39/32, 45/32, 51/32, 57/32, 64/32, 73/32, 86/32, 102/32, 128/32, 171/32, 256/32, 341/32, 512/32, 1024/32}.

10. An apparatus for controlling intra prediction for decoding of a video sequence, the apparatus comprising:
at least one memory configured to store computer program code; and
at least one processor configured to access the at least one memory and operate according to the computer program code, the computer program code comprising:
determining code configured to cause the at least one processor to determine a ratio of a width to a height of a coding unit;
adding code configured to cause the at least one processor to, based on the determined ratio being different than one, add, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles; and
selecting code configured to cause the at least one processor to select, for decoding the video sequence, one of the plurality of intra prediction modes and the additional intra prediction modes added to the table,
wherein each of the intra prediction angles included in the table has an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}.

11. The apparatus of claim 10, wherein a number of the first wide angles added to the table is 14.

12. The apparatus of claim 11, wherein each of the first wide angles added to the table has an angular direction α with tan(α) equal to {35/32, 39/32, 45/32, 51/32, 57/32, 64/32, 73/32, 86/32, 102/32, 128/32, 171/32, 256/32, 341/32, 512/32}.

13. The apparatus of claim 10, wherein a number of the second wide angles added to the table is 14.

14. The apparatus of claim 13, wherein each of the second wide angles added to the table has an angular direction α with tan(α) equal to {35/32, 39/32, 45/32, 51/32, 57/32, 64/32, 73/32, 86/32, 102/32, 128/32, 171/32, 256/32, 341/32, 512/32}.

15. The apparatus of claim 10, wherein a number of the first wide angles added to the table is 15.

16. The apparatus of claim 15, wherein each of the first wide angles added to the table has an angular direction α with tan(α) equal to {35/32, 39/32, 45/32, 51/32, 57/32, 64/32, 73/32, 86/32, 102/32, 128/32, 171/32, 256/32, 341/32, 512/32, 1024/32}.

17. The apparatus of claim 10, wherein a number of the second wide angles added to the table is 15.

18. The apparatus of claim 17, wherein each of the second wide angles added to the table has an angular direction α with tan(α) equal to {35/32, 39/32, 45/32, 51/32, 57/32, 64/32, 73/32, 86/32, 102/32, 128/32, 171/32, 256/32, 341/32, 512/32, 1024/32}.

19. A non-transitory computer-readable storage medium storing instructions that cause a processor to:
determine a ratio of a width to a height of a coding unit;
based on the determined ratio being different than one, add, to a table including a plurality of intra prediction modes corresponding to intra prediction angles, first wide angles toward a bottom-left edge of the coding unit, second wide angles toward a top-right edge of the coding unit, and additional intra prediction modes respectively corresponding to the first wide angles and the second wide angles; and
select, for decoding a video sequence, one of the plurality of intra prediction modes and the additional intra prediction modes added to the table,
wherein each of the intra prediction angles included in the table has an angular direction α with tan(α) equal to {0/32, 1/32, 2/32, 3/32, 4/32, 6/32, 8/32, 10/32, 12/32, 14/32, 16/32, 18/32, 20/32, 23/32, 26/32, 29/32, 32/32}.

* * * * *